UNITED STATES PATENT OFFICE.

ARTHUR EARL HOULEHAN, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS FOR THE MANUFACTURE OF LOWER-BOILING HYDROCARBONS FROM HIGHER-BOILING HYDROCARBONS.

1,334,033.  Specification of Letters Patent.  Patented Mar. 16, 1920.

No Drawing.  Application filed May 25, 1917.  Serial No. 170,810.

*To all whom it may concern:*

Be it known that I, ARTHUR EARL HOULEHAN, of Wilmington, in the county of New Castle and in the State of Delaware, have invented a certain new and useful Improvement in Processes for the Manufacture of Lower-Boiling Hydrocarbons from Higher-Boiling Hydrocarbons, and do hereby declare that the following is a full, clear, and exact description thereof.

My invention relates particularly to a process for the production of lower boiling hydrocarbon from higher boiling hydrocarbon, and is applicable to the treatment and production of aromatic hydrocarbons as well as paraffin hydrocarbons. However, my invention is particularly applicable to the production of toluol from xylols or commercial xylol.

The object of my invention is to provide an advantageous process for the production of such hydrocarbon by means of which a low boiling hydrocarbon may be readily obtained by means of a simple process. The object of my invention is, furthermore, to bring about the production of such hydrocarbon by the utilization of anhydrous aluminum chlorid.

I have discovered that such hydrocarbon, as for example, toluol, can be produced by the action of anhydrous aluminum chlorid on a higher boiling hydrocarbon, as for example, the higher benzene homologues. While my invention is capable of being carried out in many different ways, for the purpose of illustration, I shall describe only certain ways of carrying out the same.

For example, I may proceed as follows: Although all of the higher homologues are capable of being broken down to simpler bodies by treatment in accordance with my process, in order to obtain the best results I prefer the treatment of certain fractions of the higher boiling hydrocarbons. Toluol can be obtained simply by mixing the hydrocarbons with the anhydrous aluminum chlorid and then distilling, but I found that the best results are obtained in accordance with the details of my process described hereafter. I prefer to treat the fraction which I will hereafter call "xylols", and which consists principally of metaxylol. I have found that very high boiling oils retard the production of hydrocarbons in accordance with my process, and that they should preferably be absent. The fraction which I use and which I designate as the "xylols" is the fraction obtained between 135° and 145° C., obtained by fractionating ordinary solvent naphtha. To the xylols thus obtained, I add anhydrous aluminum chlorid in an amount equal to 5% to 20% of the xylols, but, for the best results I prefer to use from 5% to 10%. The anhydrous aluminum chlorid combines with a portion of the hydrocarbons either on warming or agitating in the cold to form a catalytic compound which is the active catalyst. This catalytic compound is a reddish liquid and is not miscible with the hydrocarbons. The mixture is then distilled either directly or by being heated for a short time with a reflux condenser and then distilling the hydrocarbon produced, a certain amount of toluol being thus obtained, without following any specific conditions.

I find that the best results are obtained, however, by using an efficient fractionating column and distilling first at quite a rapid rate until the temperature of the vapors reaches 115° C. The rate of distillation is then decreased, so that the temperature will not exceed 115° C. By this means I accomplish a removal of the toluol as fast as possible, and return the unchanged xylols to the still to be further acted upon. When no more of the liquid will distil below 115° C. I allow the temperature to slowly rise. From 115° C. to 135° C. the distillation is maintained at a slow rate. During this distillation toluol is formed continually, and the distillation is continued as slowly as is found to be economical. When the temperature reaches 135° C. the rate of distillation can be increased and the remainder of the distillation can be quite rapid, such distillation serving to recover the unchanged xylols and higher boiling hydrocarbons that have been formed during the reaction. The distillation can be continued until coke is formed, in which case the solid is dug out or it can be stopped at a point which will enable the residue to be run out as a liquid. The distillation may be carried out at atmospheric pressure, if desired.

While I have described my invention above in detail, I wish it to be understood that many changes may be made therein without departing from the spirit of my invention, as for example the substitution in the process of another catalyst which is capable of acting like the anhydrous aluminum chlorid described above.

I claim:

1. A process which comprises subjecting xylol to a catalyst, to produce toluol, and distilling off during the course of the reaction the toluol produced.

2. A process which comprises subjecting xylol to anhydrous aluminum chlorid, to produce toluol, and distilling off during the course of the reaction the toluol produced.

3. A process which comprises subjecting xylol to anhydrous aluminum chlorid to produce toluol and distilling off during the course of the reaction the toluol produced in such a way as to return the greater part of the unchanged higher hydrocarbon to the still.

4. A process which comprises subjecting xylol to a catalyst to produce toluol, and distilling off the toluol produced so as to return the greater part of the unchanged higher hydrocarbon to the still by means of a reflux condenser, the temperature being maintained for a time not above 115° C., and thereafter the temperature being slowly raised to 135° C.

5. A process which comprises subjecting xylol to anhydrous aluminum chlorid to produce toluol, and distilling off the toluol produced so as to return the greater part of the unchanged higher hydrocarbon to the still by means of a reflux condenser, the temperature being maintained for a time not above 115° C., and thereafter the temperature being slowly raised to 135° C.

6. A process which comprises subjecting xylol to a catalyst to produce toluol and distilling off under atmospheric pressure during the course of the reaction the toluol produced.

7. A process which comprises subjecting xylol to anhydrous aluminum chlorid to produce toluol and distilling off under atmospheric pressure during the course of the reaction the toluol produced.

8. The process of making toluol which comprises reacting upon xylols at the boiling temperature with a catalytic chemical and distilling off toluol as fast as formed while condensing and returning higher boiling bodies.

9. The process of making toluol which comprises reacting upon xylols at the boiling temperature with aluminum chlorid and distilling off toluol as fast as formed while condensing and returning higher boiling bodies.

10. The process of making toluol which comprises mixing coal tar oils substantially free of benzol and toluol with aluminum chlorid and distilling the mixture while condensing and returning vapors of bodies boiling above 115° C. and separately condensing vapors not condensed at this temperature.

In testimony that I claim the foregoing I have hereunto set my hand.

ARTHUR EARL HOULEHAN.

Witnesses:
A. M. GORMAN,
P. E. STRICKLAND.